United States Patent
Yan et al.

(10) Patent No.: US 11,249,171 B2
(45) Date of Patent: Feb. 15, 2022

(54) METHOD OF DETERMINING AN ALIGNMENT ERROR OF AN ANTENNA AND VEHICLE WITH AN ANTENNA AND A DETECTION DEVICE

(71) Applicant: Aptiv Technologies Limited, St. Michael (BB)

(72) Inventors: Honghui Yan, Wuppertal (DE); Stephanie Lessmann, Erkrath (DE); Alexander Ioffe, Bonn (DE)

(73) Assignee: Aptiv Technologies Limited, St. Michael (BB)

( * ) Notice: Subject to any disclaimer, the term of this patent is extended or adjusted under 35 U.S.C. 154(b) by 268 days.

(21) Appl. No.: 16/442,743

(22) Filed: Jun. 17, 2019

(65) Prior Publication Data

US 2020/0003868 A1 Jan. 2, 2020

(30) Foreign Application Priority Data

Jun. 28, 2018 (EP) .................................. 18180524.3

(51) Int. Cl.
*G01S 7/40* (2006.01)
*G01S 13/931* (2020.01)
(Continued)

(52) U.S. Cl.
CPC .......... *G01S 7/4026* (2013.01); *G01S 13/931* (2013.01); *B60T 7/12* (2013.01); *B60W 30/14* (2013.01); *B60W 2420/52* (2013.01); *G01S 7/403* (2021.05)

(58) Field of Classification Search
None
See application file for complete search history.

(56) References Cited

U.S. PATENT DOCUMENTS 6,335,705 B1 * 1/2002 Grace .................. G01S 7/4026
343/703
6,356,229 B1 * 3/2002 Schneider ............ G01S 7/4026
342/70
(Continued)

FOREIGN PATENT DOCUMENTS

CN 1069808 3/1993
CN 101320062 12/2008
(Continued)

OTHER PUBLICATIONS

Dominik Kellner, etc. "Joint radar alignment and odometry calibration", 18th International Conference on Information Fusion, Washington, DC 2015.
(Continued)

*Primary Examiner* — Bernarr E Gregory
(74) *Attorney, Agent, or Firm* — Colby Nipper PLLC (57) ABSTRACT

A method of determining an alignment error of an antenna is described, wherein the antenna is installed at a vehicle and in cooperation with a detection device, and wherein the detection device is configured to determine a plurality of detections. Determining the plurality of detections comprises emitting a first portion of electromagnetic radiation through the antenna, receiving a second portion of electromagnetic radiation through the antenna, and evaluating the second portion of electromagnetic radiation in dependence of the first portion of electromagnetic radiation in order to localize areas of reflection of the first portion of electromagnetic radiation in the vicinity of the antenna. The method comprises determining a first detection and at least a second detection by using the detection device, and determining the alignment error by means of a joint evaluation of the first detection and the second detection.

19 Claims, 2 Drawing Sheets

(51) Int. Cl.
*B60T 7/12* (2006.01)
*B60W 30/14* (2006.01)

(56) References Cited

U.S. PATENT DOCUMENTS

| | | | | |
|---|---|---|---|---|
| 6,363,619 | B1 * | 4/2002 | Schirmer | G01S 7/4026 |
| | | | | 33/288 |
| 6,556,166 | B1 | 4/2003 | Searcy et al. | |
| 6,636,172 | B1 * | 10/2003 | Prestl | G01S 7/4026 |
| | | | | 342/173 |
| 6,778,131 | B2 * | 8/2004 | Haney | G01S 13/931 |
| | | | | 342/174 |
| 8,830,119 | B2 | 9/2014 | Borruso | |
| 10,545,221 | B2 * | 1/2020 | Fetterman | G01S 13/931 |
| 2002/0105456 | A1 * | 8/2002 | Isaji | G01S 7/4026 |
| | | | | 342/165 |
| 2006/0176214 | A1 * | 8/2006 | Nakagawa | G01S 7/4026 |
| | | | | 342/174 |
| 2007/0115169 | A1 | 5/2007 | Kai et al. | |
| 2008/0012752 | A1 * | 1/2008 | Okamura | G01S 13/931 |
| | | | | 342/165 |
| 2013/0088382 | A1 * | 4/2013 | Lee | G01S 7/4026 |
| | | | | 342/174 |
| 2014/0347206 | A1 * | 11/2014 | Steinlechner | G01S 7/4026 |
| | | | | 342/5 |
| 2015/0276923 | A1 | 10/2015 | Song et al. | |

FOREIGN PATENT DOCUMENTS

| | | |
|---|---|---|
| CN | 101631318 | 1/2010 |
| CN | 103557876 | 2/2014 |
| CN | 103558758 | 2/2014 |
| CN | 103868523 | 6/2014 |
| CN | 104316903 | 1/2015 |
| CN | 104395777 | 3/2015 |
| CN | 104943694 | 9/2015 |
| CN | 105144472 | 12/2015 |
| CN | 105353228 | 2/2016 |
| CN | 107076832 | 8/2017 |
| EP | 3454079 A1 | 3/2019 |
| WO | 2014/003615 A1 | 1/2014 |

OTHER PUBLICATIONS

Kwang-rok Choi, etc. "Automatic radar horizontal alignment scheme using stationary target on public road", Proceedings of the 10th European Radar Conference, 2013, Nuremberg, Germany.
"Foreign Office Action", EP Application No. 18180524.3, dated Jul. 22, 2020, 4 pages.
"Foreign Office Action", CN Application No. 201910565232.4, dated Apr. 19, 2021, 30 pages.

* cited by examiner

METHOD OF DETERMINING AN ALIGNMENT ERROR OF AN ANTENNA AND VEHICLE WITH AN ANTENNA AND A DETECTION DEVICE

CROSS-REFERENCE TO RELATED APPLICATION

This application claims the benefit under 35 U.S.C. § 119(a) of European Patent Application EP 18180524.3, filed Jun. 28, 2018, the entire disclosure of which is hereby incorporated herein by reference.

TECHNICAL FIELD

This disclosure generally relates to a method of determining an alignment error of an antenna. The antenna is generally to be installed at a predetermined position in which it is configured for operation. A deviation of the antenna from the predetermined position is denoted as an alignment error, which negatively affects operation.

BACKGROUND

In some applications, the antenna is used in cooperation with a detection device for determining a plurality of detections. Determining the plurality of detections comprises emitting a first portion of electromagnetic radiation through the antenna, receiving a second portion of electromagnetic radiation through the antenna, and evaluating the second portion of electromagnetic radiation in dependence of the first portion of electromagnetic radiation in order to localize areas of reflection of the first portion of electromagnetic radiation in the vicinity of the antenna. The areas of reflections may be represented by points of reflections. The detections can thus be formed by detection points.

At least some of said detections or detection points represent position information, which is usually acquired relative to the predefined position of the antenna. The predefined position can for example be stored in the detection device. The "relative" position information of the detections may be used to identify and localize objects in the vicinity of the antenna. However, if the predefined position of the antenna does not match with the true position (i.e., the alignment error is not zero) then each of the detections is contaminated with an error that can significantly corrupt the identification and localization of objects by means of the detections. This is to say that the alignment error can badly affect any gathering of position information by means of the antenna.

For example if the antenna is a radar antenna and the detection system is of a radar type then each of the detections from this system preferably comprises an azimuth angle or generally an angle relative to a predefined angle of the antenna. It is understood that an angle is a type of position information. An alignment error of 1 degree (1°) with respect to the predefined angle of the antenna would already result in a significant position error of the point of reflection that is associated with the underlying detection. This position error increases with the range of the point of reflection. For example, if the point of reflection associated with a given detection is located at a distance of 100 metres from the antenna then the position error can be estimated to be 1.75 m (100 m ×sin(1°)).

Alignment errors are especially problematic in applications where the installation environment of the antenna is moving and where the position information from the detections is relevant for security. In particular, an antenna which is installed at a vehicle and used in the context automated driving applications should not be misaligned because applications such as object tracking, occupancy grid mapping, adaptive cruise control, autonomous emergency braking or advanced driver assist systems would all suffer even from small alignment errors.

Alignment errors can be avoided to some extent if the antenna is properly aligned after or during installation. In the example of a vehicle this means that the antenna is aligned during assembly of the vehicle but before the vehicle is delivered to the end costumer. However, an alignment error can occur during operation of the vehicle, e.g., due to vibrations of the vehicle. It is difficult to physically correct the alignment error after full assembly of the vehicle and corresponding repairing expenses are undesired.

It would be possible to determine the alignment error electronically and to process any detections determined by the antenna in dependence of the alignment error. This can be denoted as electronic compensation of the alignment error. However, determining the alignment error is difficult during operation of the vehicle and usually requires extensive knowledge of the motion of the vehicle and the detections. Estimating this knowledge is error prone and the determined alignment error would therefore be not precise enough in order to reliably compensate the true alignment error.

SUMMARY

Described herein are techniques to provide improved ways of coping with an alignment error of an antenna installed in a vehicle.

In one embodiment, a method of determining an alignment error of an antenna comprises determining a first detection and at least a second detection by using a detection device, and determining the alignment error by means of a joint evaluation of the first detection and the at least second detection.

As indicated already above the antenna is or is to be installed at a vehicle and in cooperation with the detection device. This is to say that in the context of the method the antenna is generally associated with a predefined installation position in a vehicle, wherein the detection device may be connected to the antenna by wires or even in a wireless way. The antenna can also be an integral part of the detection device.

More than one antenna can be involved and in cooperation with a single detection device. It is also possible that a plurality of antennas are installed in a single vehicle and in cooperation with separate detection devices, which may be controlled by a supervising control unit. In case of more than one antenna, each antenna can be associated with its own installation position. Therefore each antenna may have its own alignment error, which is determined by the method. In the context of the method the expression "determining an alignment error" is understood as an ambitious estimation, i.e. the true alignment error is determined as accurately as possible.

In another embodiment, a detection device that cooperates with the antenna (or one of a plurality of antennas) is configured to determine a plurality of detections. As pointed out above, determining the detections comprises emitting a first portion of electromagnetic radiation through the antenna, receiving a second portion of electromagnetic radiation through the antenna, and evaluating the second portion of electromagnetic radiation in dependence of the first portion of electromagnetic radiation in order to localize areas of reflection of the first portion of electromagnetic radiation in the vicinity of the antenna. It is understood that the transmission and reception of the radiation is intimately connected to the use of the antenna in its installation position. The detections can be at least partially determined within one mutual time instance or sequentially. Preferably, detections involved in the method are associated with groups of detections. These groups correspond to scans, wherein in each scan the detections are acquired at one single time instance, i.e. they are determined in parallel. The method can be carried out per group and the alignment error per group can be subject to a filtering over time in order to arrive at a more accurate estimation, as will be discussed in greater detail further below. In any case, the method can be adapted to allow the alignment error to be determined in real time.

The definition of a detection as recited above can be interpreted as a general definition. The disclosure is not limited to this definition and the aspects of the invention as described herein can generally be applied to other types of detections, which involve usage of an antenna.

Having regard to the first and second detection it is noted that these detections can be randomly chosen from a plurality of detections. Therefore, an amount of pre-processing or selection processing of the detections can be reduced. However, it is also possible to select specific detections as first and second detections, as will be explained further below.

An aspect of the invention is the joint evaluation of at least two detections. This means that the first detection and the second detection are evaluated in relation to each other. This can be regarded as a type of relative processing and an explicit normalization is not necessary. The joint evaluation allows to extract the alignment error directly from the detections. The method is therefore suitable to be carried out self-sufficiently, in particular in the vehicle.

The first detection and the second detection can form a detection pair. This means that a plurality of detections can be evaluated in pairs of detections, i.e. pair-wise. The joint evaluation can for example be carried out multiple times on the basis of different detection pairs, which can be chosen from the plurality of detections. In this way, candidates of alignment errors can be determined and further processed in order to arrive at a final alignment error. This will be discussed in greater detail further below. It is, however, also possible to perform a joint evaluation on the basis of more than two detections, i.e. to carry out the joint evaluation at once on the basis of more than two detections, e.g., by applying a least-squares method to the detection points in order to determine the alignment error.

Preferred embodiments of the method are described in the dependent claims, the description, and the drawings.

According to a preferred embodiment the method further comprises processing a detection from the detection device in dependence of the alignment error. The alignment can thus be compensated in a purely electronical way, e.g. by subtracting the alignment error from the corresponding position value of a detection.

Preferably, each of the first detection and the second detection comprises an angular position relative to a reference, i.e. predefined angle of the antenna. The angular position can be given as an azimuth angle that is defined relative to a boresight angle of the antenna. Therefore, the angular position can be represented by a phase, which is measured through spectral analysis of the electromagnetic radiation. The alignment error of the antenna can thus also manifest as a phase error.

Alternatively or additionally to an angular position, each of the first detection and the second detection can comprise a velocity value of the antenna relative to a velocity value of an area of reflection being associated with the first detection and/or the second detection. The velocity can be given as the Doppler speed which may be defined as the product of the measured Doppler-frequency shift and half of the wavelength of the radiation. The joint evaluation can be adapted to not involve measured range values of the detections. Therefore, it can be that the detections may not comprise range values representing the distance between a point of reflection and the antenna.

As is known to those skilled in the art an azimuth angle is an angular measurement in a spherical coordinate system. The vector from an observer (i.e., the origin of the antenna) to a point of interest (i.e., point of reflection) is projected perpendicularly onto a reference plane (i.e., a horizontal plane); the angle between the projected vector and a reference vector on the reference plane is called the azimuth angle.

As is also generally known the boresight angle of the antenna refers to antenna boresight, which is usually defined as the axis of maximum gain (maximum radiated power) of a directional antenna. For most antennas the boresight is the axis of symmetry of the antenna. For example, for axial-fed dish antennas, the antenna boresight is the axis of symmetry of the parabolic dish, and the antenna radiation pattern (the main lobe) is symmetrical about the boresight axis. Most antennas boresight axis is fixed by their shape and cannot be changed.

According to a specific embodiment the joint evaluation is only based on the first detection and the second detection as far as detections are concerned. Other information, for example velocity measurements of the vehicle can be used in the joint evaluation.

In a preferred embodiment the detection device comprises a radar system, preferably a pulse-Doppler radar system, and wherein at least the first detection and the second detection are determined by means of the radar system. The electromagnetic radiation preferably has a frequency well above 1 kHz but is not restricted to this. In general, other types of detection devices are also possible, for example optical detection devices in which an optical sensor and receiver pair can form an antenna in the meaning of the invention.

Said radar system can generally be configured to provide an angular position information for each detection, in particular an azimuth angle or another angle. This can be done, e.g., by using the directivity of the antenna, which may thus be denoted as a directive antenna. Directivity, sometimes known as the directive gain, is the ability of the antenna to concentrate the transmitted energy of the electromagnetic radiation in a particular direction. An antenna with high directivity is usually called a directive antenna. By measuring the direction in which the antenna is pointing when the reflected radiation, i.e. the second portion of radiation, is received, the azimuth angle (and also the elevation angle) can be determined with respect to the direction, wherein the direction is preferably equal to the boresight of the antenna. The accuracy of this angular measurement is determined by the directivity, which is a function of the size of the antenna.

Turning back to the joint evaluation of the method, the joint evaluation can be based on a ratio, which represents a deviation between the first detection and the second detection. Such a ratio has benefits in view of processing the method efficiently and with high accuracy. Different types of ratios will be described further below.

Preferably, the joint evaluation comprises evaluating the first detection relative the second detection in dependence of the velocity of the vehicle. It has been found that the velocity of the vehicle can be used to improve the overall accuracy of the method. It is preferred that the velocity of the vehicle is measured during or at least in temporal correspondence with the determination of the first and second detection.

One way to improve the accuracy of the method in dependence of the velocity of the vehicle is to choose between different expressions for evaluation. In one embodiment determining the alignment error comprises selecting one of a first algebraic expression and at least a second algebraic expression for the joint evaluation, wherein the selection depends on the velocity of the vehicle.

An algebraic expression can generally be regarded as a mathematical expression, which includes a plurality of variables that are subject to mathematical operators, e.g. addition, subtraction, multiplication, root, and functions. It can consist of more than one term. The variables represent numerical data from at least the first and second detection and can additionally include further data, in particular data acquired at the time when the detections have been determined. Preferably, the algebraic expression has a closed form. This allows evaluating the expression with high efficiency.

An algebraic expression, for example one or each of the first and second algebraic expressions, can have two alternative solutions. This may be the case when the algebraic expression is a solution from a quadratic equation, wherein the algebraic expression or a part thereof can either have a negative or a positive sign, as is known from the art. For the purpose of the method according to at least some of the embodiments, if the algebraic expression has two solutions preferably the one of the two solutions is chosen for the joint evaluation which leads to the lower alignment error. This is in line with the assumption that the alignment error is usually smaller than larger, e.g. for an antenna installed in a vehicle. Efficient processing of the method is also enhanced because the criterion of choosing the solution of the lower alignment error is simple. Other strategies to cope with different solutions are also possible, for example in the form of other plausibility criterions.

According to a preferred embodiment the joint evaluation comprises evaluating a first algebraic expression or a second algebraic expression. The first algebraic expression is dependent from an angular velocity component of the vehicle. The angular velocity component is preferably a yaw rate of the vehicle, which may be defined with respect to a yaw axis of the vehicle, as will be explained further below. The first algebraic expression is not dependent from a linear velocity component, wherein the linear velocity component represents the velocity of the vehicle in a heading direction of the vehicle.

If the joint evaluation comprises evaluating an algebraic expression, the joint evaluation is preferably limited to evaluating only one type of algebraic expression, for example only the first algebraic expression may be used. The first algebraic expression can solely be dependent on the yaw rate as far as direct motion figures of the vehicle are concerned.

The second algebraic expression can be a complement of the first algebraic expression. For example, the second algebraic expression can be dependent from a linear velocity component that represents the velocity of the vehicle in a heading direction of the vehicle. In addition, the second algebraic expression can be independent from an angular velocity component of the vehicle, preferably the yaw rate of the vehicle.

The algebraic expressions may generally be chosen under a certain condition, wherein such a condition can be defined in dependence of the motion of the vehicle, in particular in dependence of the yaw rate and/or a linear velocity component of the vehicle. It is preferred that the yaw rate and/or the linear velocity are measured at a time instance which corresponds to the time instance of the detection measurements. This is to say that motion parameters of the vehicle and detections are measured at the same time.

In one embodiment the joint evaluation comprises evaluating the first algebraic expression under the condition that the velocity of the vehicle in a heading direction of the vehicle is large relative to the velocity of the vehicle in a direction being transverse to the heading direction. In other words, the vehicle is moving predominantly in the heading direction. This means that steering movements are relatively low and/or that the velocity of the vehicle is high. It can be assumed that if the velocity of the vehicle is high, e.g. above 100 km/h, the driver will avoid strong steering actions during normal operation, i.e. the yaw rate will be low. In this regard, it is also possible that the joint evaluation comprises evaluating the first algebraic expression under the condition that the velocity of the vehicle in a heading direction of the vehicle is above a first threshold. Since the velocity is usually evaluated in any car the latter condition is simple and requires essentially no relevant processing resources. In light of the foregoing it is understood that the joint evaluation can comprise evaluating the first algebraic expression under the condition that the velocity of the vehicle in a direction being transverse to the heading direction is below a second threshold.

The above conditions for selecting the first algebraic expression can be used separately or in combination. Combining the conditions can lead to a more precise estimation of the alignment error. Separate usage of the conditions can be realized for example by checking only one of the conditions in order to decide whether the first algebraic condition is selected or not.

The principle of a conditional selection can also be applied to the second algebraic expression. Preferably, the conditions for selecting the second expression can be a complement or opposite to the conditions for selecting the first expression. For example the joint evaluation can comprise evaluating the second algebraic expression under the condition that the velocity of the vehicle in a heading direction of the vehicle is low relative to the velocity of the vehicle in a direction being transverse to heading direction. An alternative or additional condition can be that the velocity of the vehicle in a heading direction of the vehicle is below a third threshold. Yet a another condition would be that the velocity of the vehicle in a direction being transverse to the heading direction is above a fourth threshold. In light of the complementing nature of the conditions between the first and second algebraic conditions, it is understood that the first and third thresholds can be equal. Furthermore, the second and third thresholds can be equal. In this way, it can be ensured that for each value of an expected range of velocity values a suitable algebraic expression is defined by way of selection. The number of checks can also be reduced because one condition can be sufficient. More than two different algebraic expressions can be used in a similar fashion.

According to a further embodiment the first algebraic expression and/or the second algebraic expression does not comprise a logarithm. Computational efficiency of the method is thus further increased. For the same reason the joint evaluation does preferably not involve using an iterative algorithm. This is to say that the joint evaluation on the basis of two given detections does not involve repeated evaluations of a cost function until a convergence criterion is met.

An algebraic expression for the joint evaluation can be simplified under the assumption that the alignment error is small. Under this assumption the expression can be derived analytically and simplified by means of a Taylor approximation. This can be done so as to arrive at a simple algebraic expression that makes no use of the costly logarithm function and is preferably real-valued so that costly analysis of a complex expression is avoided.

According to a further embodiment the method comprises determining a plurality of candidates for the alignment error, wherein the alignment error is determined from the candidates by processing the candidates by means of a robust estimation algorithm. A robust estimation algorithm is understood as an algorithm which reduces the effect of outliers in the data. Such outliers are for example detection points, which substantially deviate from a pattern of neighbouring detection points and therefore are likely to be a result of noise. Detections, which are determined under realistic conditions can be expected to have some degree of noise and this also affects the alignment error, which is determined on the basis of the detections. Therefore, using a robust estimation algorithm is particularly suitable if the detections are determined under real conditions, which is the case if the vehicle is operated in a usual traffic scenario. Examples of such robust estimation algorithms are the random sample consensus (RANSAC) algorithm and the Kalman filter, both known from the art. It is understood that a robust estimation algorithm can involve iterative processing of candidates. Each of these candidates is, however, preferably determined by means of a joint evaluation of a first and a second detection without an iterative algorithm.

Different robust algorithms can be used in combination in order to determine the (final) alignment error. For example, it is possible to first apply the RANSAC algorithm in order to identiy a subset of a plurality of candidates of the alignment error, wherein the candidates have been determined on the basis of a plurality of detections acquired at one time instance (i.e., one single scan), preferably in a pairwise manner as discussed above. This can be done for several groups of detections, which have been acquired over time, i.e. the groups correspond to individual scans, which are preferably sequentially acquired over time. Afterwards, the subset of candidates for each scan can be filtered by using the Kalman algorithm or another similar algorithm. This corresponds to a robust filtering of the candidates in the time domain, which leads to a final estimation of the alignment error being expected to be more accurate than without the robust filtering.

According to another embodiment the first detection is associated with a first object and the second detection is associated with a second object. Alternatively, the first detection and the second detection can also be associated with a mutual object. The term "associated" can have the meaning that the point of reflection of a respective detection is located on the object.

Relying on detections, which are associated, i.e. assigned to objects can improve the reliability of the method, i.e. the determined alignment error can be assumed to be more accurate. An object can be for example another vehicle, a traffic sign, or a wall, i.e. a confined physical object in the vicinity of the antenna. The object can generally be rigid body object and can have a notable physical size, e.g. a length of at least 1 m. The object can also be a virtual object that is defined with respect to characteristics of the detection points, which are located on the object.

It is understood that one or more criteria can be applied for distinguishing between detections associated with an object and those which are not. One criterion could be to jointly analyse a plurality of neighbouring detections and if these detections show a certain pattern which matches an expected form or range of an object it can be assumed that all detections are associated with the object. Similarly, detections stemming from different objects can be identified and thus assigned to these objects. In general, relying on detections which are associated to objects is one way to filter raw detections. It is, however, also possible to choose the first and second detection at random from a plurality of raw detections from a sensor. Another option is to rely on detections, which are most likely to represent actual points of reflections. In this case, a detection can be associated with an object of any kind, which can be, e.g., the ground on which the vehicle is moving.

The first object and/or the second object can be stationary objects. This is to say that the objects are not moving relative to their position when the detections are determined, i.e. the objects are preferably absolutely stationary. In this way, noise and other uncertainty about the validity of the detections can be reduced, thereby enhancing the method. The vehicle is preferably not stationary, i.e. moving when the detections are determined. In the example of a Doppler-pulse radar system the velocity of the vehicle causes a Doppler-shift, which is a valuable information and can therefore be used with a benefit in the joint evaluation.

The invention also relates to a storage device with instructions for carrying out the method of one of the embodiments described herein. The instructions can be a direct implementation of the method or can generally be instructions that are adapted to realize an implementation of the method on a computing device.

The invention further relates to a vehicle with an antenna and a detection device. The antenna is installed on the vehicle and configured to cooperate with the detection device. The detection device is configured to determine a plurality of detections on the basis of a first portion of electromagnetic radiation emitted through the antenna and a second portion of electromagnetic radiation received through the antenna. The vehicle comprises a control unit configured to carry out the method according to one of the embodiments described herein. The control unit can be a part of detection device or the control unit can be formed by the detection device. Further features and advantages will appear more clearly on a reading of the following detailed description of the preferred embodiment, which is given by way of non-limiting example only and with reference to the accompanying drawings.

BRIEF DESCRIPTION OF DRAWINGS

Further details will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
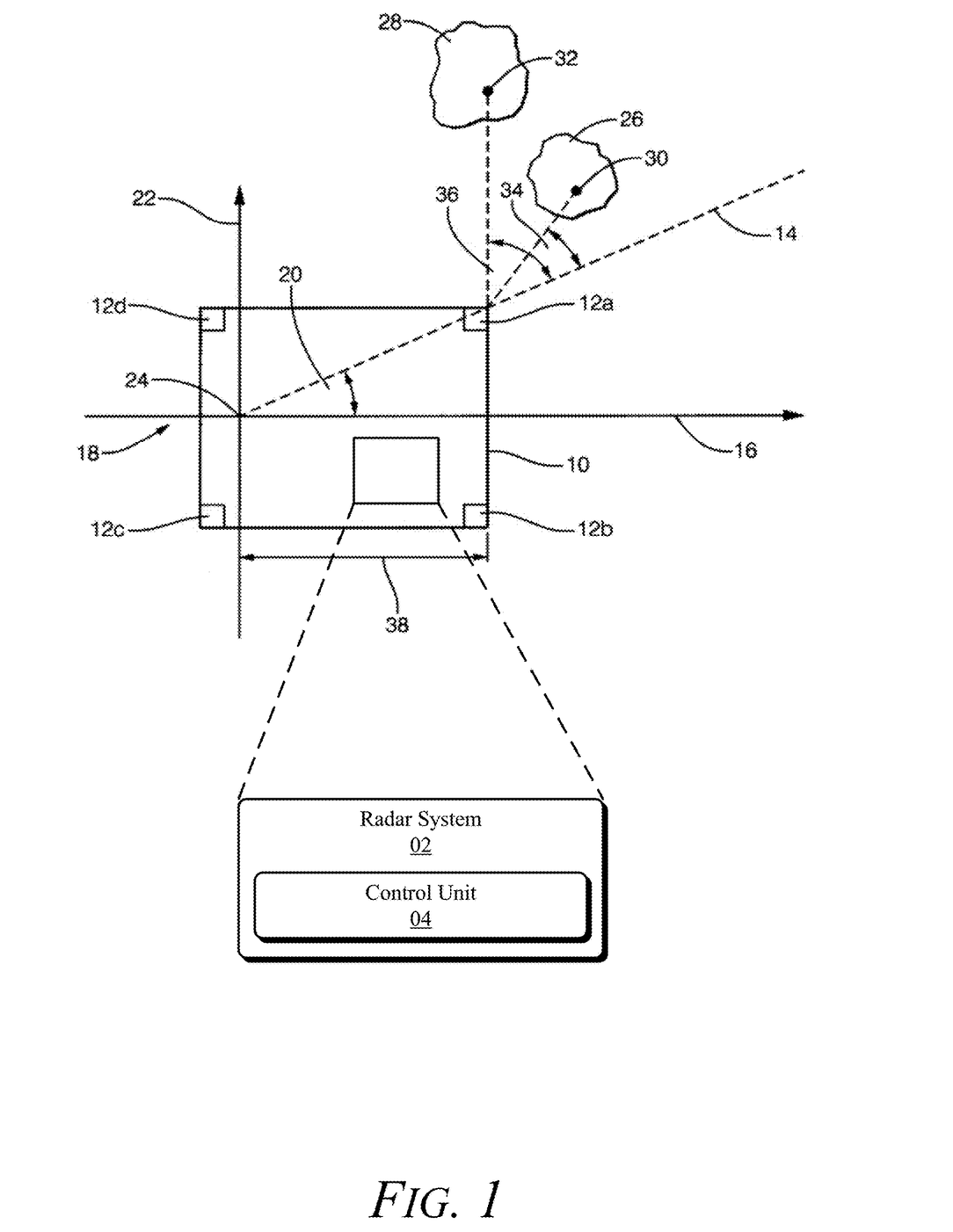
FIG. 1 illustrates a vehicle with two objects in the vicinity of the vehicle.

A vehicle 10 comprises four antennas 12a, 12b, 12c, and 12d being installed in the outer corners of the vehicle 10 (indicated very schematically as a rectangle). These installation positions are only exemplary and other distributions and other numbers of antennas are also possible. The antennas 12a, 12b, 12c, 12d are preferably radar antennas (e.g., radomes) which are connected to a radar detection system 02 that uses a control unit 04. The radar detection system 02 is preferably located in the vehicle 10 and can be operated autonomously in the vehicle.

In the following, reference is made to antenna 12a but the corresponding disclosure can be applied mutatis mutandis to the other antennas 12b, 12c, 12d.

Antenna 12a is installed at a predetermined position. Without limitation the predetermined position can be characterized by the orientation of an axis 14. The axis 14 is denoted as the boresight of the antenna 12a. The orientation of axis 14 is expressed relative to an orientation of an x-axis 16 of a predefined coordinate system 18 of the vehicle 10. In FIG. 1, the orientation of axis 14 is expressed by an azimuth angle 20 that is also denoted as $\theta_{boresight}$ or $\theta_{BS}$.

It is understood that the coordinate system 18 is a Cartesian coordinate system, which also comprises a y-axis 22. The origin 24 of the coordinate system 18 is located in a fixed position in a rear part of the vehicle 10 but other positions are also possible. The x-axis 16 is oriented in a predefined heading direction of the vehicle 10. This is usually the direction in which the driver generally looks through the windscreen of the vehicle 10. It is also the direction of travel of the vehicle 10 if the steering wheel of the vehicle 10 is in a neutral position and the driver performs no steering action. The coordinate system 18 is fixed relative to the vehicle 10.

A first object 26 and a second object 28 are located at different positions in the vicinity of the antenna 12a as shown in FIG. 1. By using the antenna 12a a first detection 30 and a second detection 32 are determined. The detections 30 and 32 represent points of reflection, which are located on the first object 26 and the second object 28, respectively. The first detection 30 comprises a first azimuth angle 34 relative to the axis 14 and the second detection 32 comprises a second azimuth angle 36 relative to the axis 14. The first and second angles 34, 26 are also denoted as angles n and m, respectively.

Under the assumption that the objects 26, 28 are stationary the relative velocity between the antenna 12a and the objects 26, 28 can generally be expressed as:

$$-v_{Dop} = v_x^{host} \cos(\theta) + v_y^{host} \sin(\theta),$$

wherein $v_x^{host}$ is the velocity of the antenna 12a in the direction of the x-axis 16 and $v_y^{host}$ is the velocity of the vehicle 10 in the direction of the y-axis 22. The y-component $v_y^{host}$ can also be expressed as $v_y^{host} = L_x \omega_{yaw}$, wherein $\omega_{yaw}$ is the yaw rate of the vehicle 10 and $L_x$ is the distance 38 between the origin 24 and the antenna 12a with respect to the x-axis 16. A virtual axis (not shown), goes through the origin and is oriented orthogonally to the x-axis 16 and the y-axis 22 can also be denoted as the yaw axis of the vehicle 10 (the y-axis 22 may also indicate the rear axis of the vehicle 10).

The relative velocity $v_{Dop}$ is positive when the vehicle 10 is moving away from the objects 26, 28 and negative when the vehicle 10 is moving towards the objects 26, 28. This is an exemplary definition in line with a definition $v_{Dop} = f_D \lambda / 2$, wherein $f_D$ is the measured Doppler frequency (Doppler shift), and $\lambda$ is the wavelength of the radar waveform underlying the detections 30, 32, i.e. the wavelength of the emitted radiation.

The angle $\theta$ is generally defined as $$\theta = \theta_{azi} + \theta_{boresight} + \theta_{align},$$

wherein $\theta_{azi}$ is one of the angles 34, 36 and $\theta_{align}$ is the alignment error of antenna 12a (not shown). It is understood that the alignment error is not limited to an error of azimuth angle although this is preferred. The alignment error should be zero in order to ensure that the angles 34, 26 can be correctly determined. This is because $\theta_{azi}$, i.e. the angles 34, 36 are determined with respect to axis 14, wherein the angle 20 of axis 14, i.e. $\theta_{boresight}$ is assumed to match with a predetermined value. A deviation from this value is the alignment error $\theta_{align}$, as can readily be seen from the above equation.

A ratio A between the detections 30, 32 can be formed as:

$$\frac{-v_{Dop}^n + L_x \omega_{yaw}\sin(\theta_{azi}^n + \theta_{boresight} + \theta_{align})}{-v_{Dop}^m + L_x \omega_{yaw}\sin(\theta_{azi}^m + \theta_{boresight} + \theta_{align})} = \frac{v_x^{host}\cos(\theta_{azi}^n + \theta_{boresight} + \theta_{align})}{v_x^{host}\cos(\theta_{azi}^m + \theta_{boresight} + \theta_{align})}$$

wherein the angles $\theta_{azi}^m$ and $\theta_{azi}^n$ correspond to the angles 34 and 36, respectively. The Doppler velocities $v_{Dop}^m$ and $v_{Dop}^n$ correspond to the Doppler velocities (or Doppler speeds) determined for the detections 30 and 32, respectively.

As can readily be seen, $v_x^{host}$ cancels in the above ratio A. The resulting ratio is independent from $v_x^{host}$, i.e. independent from the velocity of the vehicle 10 along the x-axis 16. However, the ratio A is dependent from the yaw rate $\omega_{yaw}$.

A similar ratio B can be formed as:

$$\frac{\sin(\theta_{azi}^n + \theta_{boresight} + \theta_{align})}{\sin(\theta_{azi}^m + \theta_{boresight} + \theta_{align})} = \frac{v_x^{host}\cos(\theta_{azi}^n + \theta_{boresight} + \theta_{align}) + v_{Dop}^n}{v_x^{host}\cos(\theta_{azi}^m + \theta_{boresight} + \theta_{align}) + v_{Dop}^m}$$

wherein the velocity of the vehicle 10 in the direction of the y-axis 22, i.e. $v_y^{host} = L_x \omega_{yaw}$ cancels. Ratio B is dependent from the velocity $v_x^{host}$ but independent from the yaw rate $\omega_{yaw}$. Therefore, ratios A and B are complementing with respect to their dependencies of the linear velocity $v_x^{host}$ and the yaw rate $\omega_{yaw}$.

For each of the ratios A and B a solution for the alignment error $\theta_{align}$ can be derived using trigonometric addition theorems and complex numbers, e.g. Euler's formula, known to the skilled person. In this way, ratio A can solved for the alignment error to give a first algebraic expression A' (see Annex), wherein $\theta_{iso} = \theta_{azi} + \theta_{boresight}$ (with superscripts n and m corresponding to detections 30 and 32) and i is the imaginary unit of complex numbers, commonly interpreted as root of −1. The function e is the exponential function.

In a similar fashion, ratio B can be reshaped and solved to give a second algebraic expression B' (see Annex) for the alignment error.

It has been found that expressions A', and B' can be used to determine the alignment error instead of solutions which are determined by iterative algorithms. The accuracy is the same but using the direct solutions A' and B' is computationally more efficient.

Note that expressions A' and B' are complex expressions and also require evaluation of a logarithm, i.e. the logarithmic function (log). It is possible to derive real-valued expressions without logarithms by using trigonometric addition theorems and Taylor series expansion, in particular Maclaurin series expansion. Under the assumption that the alignment error is small, the Taylor series expansion can be limited to a low number of terms. In particular, an expansion for the cosine can be limited to the first two terms. In this way, the ratio A can be reformed to an equation, which is quadratic with respect to the alignment error $\theta_{align}$. A solution of this equation gives an algebraic expression A" (see Annex).

Similarly, the ratio B can be solved for the alignment error giving a further algebraic expression B", also shown in the Annex.

Note that expression A" is dependent from the yaw rate $\omega_{yaw}$ but is not dependent from the velocity $v_x^{host}$. In contrast, expression B" is dependent from the velocity $v_x^{host}$ but is not dependent from the yaw rate $\omega_{yaw}$.

In general, each of the expressions A', A", B', and B" can be used to determine the alignment error. Preferably, the expressions A" or B" are used selectively in dependence of the velocity of the vehicle 10. For example if the velocity of the vehicle along the x-axis 16, i.e. the velocity $v_x^{host}$ is above a first threshold then the expression A" may be used, which is independent from the velocity $v_x^{host}$. A reason for this is that any measurement error of the high velocity $v_x^{host}$ would have a large effect in the expression A". Therefore, it is better to rely on the yaw rate $\omega_{yaw}$, which can be assumed to be small due to the high velocity. In turn, if the yaw rate $\omega_{yaw}$ is high it is better to rely on the low velocity $v_x^{host}$. So, in the latter case the expression B" can be used instead of expression A".

By selecting different algebraic expressions for determining the alignment error the accuracy of the determined alignment error is usually higher compared to the case that only one expression is used, i.e. the found alignment error better matches the true alignment error.

Note that each of the algebraic expressions A" and B" comprises two alternative solutions (the second term is either added to or subtracted from the first term). It is possible to randomly choose one of the alternatives or to choose one of the alternatives by using plausibility checks. For example, it is possible to choose the alternative which better matches with an expected range or distribution of alignment errors due to mechanical reasons of the installation environment of the antenna (e.g., alignment errors above a certain threshold are impossible). The same principles can be applied when using expressions A' and B'. It is preferred to choose the one of the two alternative solutions that has the lower alignment error.

Each of the expressions A', A", B', and B" is regarded as a joint evaluation of two detections, namely the first detection 30 and the second detection 32. In this regard, the first and second detections 30, 32 can also be interpreted as a detection pair. The first and second detections 30, 32 can generally be chosen at random from a plurality of detections, e.g. 500 detections. However, predefined criteria can be applied for choosing the first and second detections 30, 32, for example that the detections are located on different objects as shown in FIG. 1.

Figure 2:
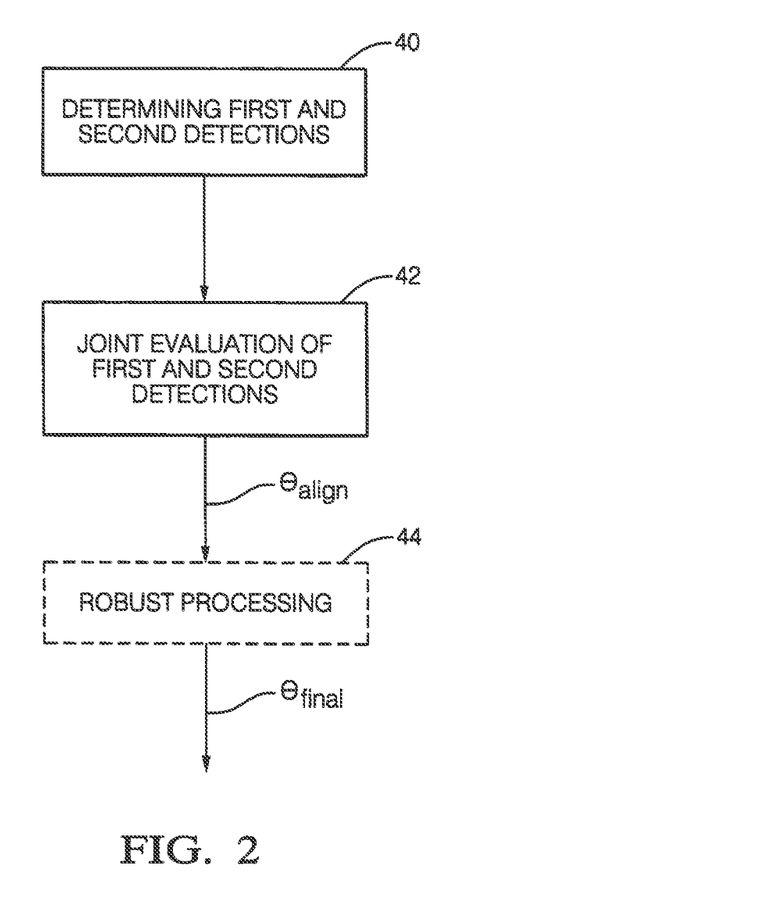
FIG. 2 shows an embodiment of a method according to the invention.

FIG. 2 shows an overview of the method for determining the alignment error. It starts with block 40, which comprises determining a first and at least a second detection, e.g. the first detection 30 and the second detection 32. In the next block 42 ("joint evaluation"), the detections 30, 32 are evaluated in relation to each other by evaluating at least one of the expressions A', A", B', and B", preferably only one of the expressions. This gives a value for the alignment error. In a further block 44, a robust processing can be applied to a plurality of solutions for the alignment error. These alignment errors are also denoted as candidates and are all determined through blocks 40, 42, and possibly further processing blocks (not shown). A robust processing algorithm can be applied to the candidates, for example Random Sample Consensus (RANSAC) and/or Kalman Filter. By robust processing a final solution for the alignment error, $\theta_{final}$, can be determined. This final solution is expected to be more accurate than most of the individual candidates.

On the basis of the final alignment error $\theta_{final}$ any detections, which are acquired by means of the antenna 12a can be corrected, i.e. compensated so as to better represent true positions of points of reflections. For example, the alignment error is subtracted from any angle, such as the angles 34, 36 in FIG. 1. In this way, the antenna 12a is electronically aligned and a mechanical alignment is not necessary.

The embodiments of the method as described herein can all be implemented to fulfil real-time capability. This means that all detections which are acquired by using the antenna 12a can readily be compensated with a minimum latency. The antenna 12a can thus be self-aligning with regard to the radar system that is connected with the antenna 12a. The compensated detections have a higher validity than uncompensated (raw) detections. An automated driving application for the vehicle 10, which is based on the compensated detections, is therefore more reliable compared to the case when using uncompensated detections.

While this invention has been described in terms of the preferred embodiments thereof, it is not intended to be so limited, but rather only to the extent set forth in the claims that follow.

Annex $$A': \theta_{align} = -i \log \left( \frac{L_x \omega_{yaw}\left(e^{2\theta_{iso}^n i} - e^{2\theta_{iso}^m i}\right) i \pm \sqrt{\frac{4 v_{Dop}^n v_{Dop}^m \left(e^{(\theta_{iso}^n + 3\theta_{iso}^m)i} + e^{(3\theta_{iso}^n + \theta_{iso}^m)i}\right) - (L_x \omega_{yaw})^2}{\left(e^{4\theta_{iso}^m i} + e^{4\theta_{iso}^n i}\right) - \left(\frac{(2v_{Dop}^n)^2 + (2v_{Dop}^m)^2 - 2(L_x \omega_{yaw})^2}{2(L_x \omega_{yaw})^2}\right) e^{2i(\theta_{iso}^n + \theta_{iso}^m)}}}}{2\left(v_{Dop}^n e^{(\theta_{iso}^n + 2\theta_{iso}^m)i} - v_{Dop}^m e^{(2\theta_{iso}^n + \theta_{iso}^m)i}\right)} \right)$$

$$B': \theta_{align} = -i \log \left( \frac{v_x^{host}\left(e^{2\theta_{iso}^n i} - e^{2\theta_{iso}^m i}\right) \pm \sqrt{\frac{-4 v_{Dop}^n v_{Dop}^m \left(e^{(\theta_{iso}^n + 3\theta_{iso}^m)i} + e^{(3\theta_{iso}^n + \theta_{iso}^m)i}\right) + (v_x^{host})^2}{\left(e^{4\theta_{iso}^m i} + e^{4\theta_{iso}^n i}\right) + \left(\frac{(2v_{Dop}^n)^2 + (2v_{Dop}^m)^2 - 2(v_x^{host})^2}{2(v_x^{host})^2}\right) e^{2i(\theta_{iso}^n + \theta_{iso}^m)}}}}{2\left(v_{Dop}^n e^{(\theta_{iso}^n + 2\theta_{iso}^m)i} - v_{Dop}^m e^{(2\theta_{iso}^n + \theta_{iso}^m)i}\right)} \right)$$

$$B'': \theta_{align} = \frac{v_{Dop}^n \cos(\theta_{azi}^m + \theta_{BS}) - v_{Dop}^m \cos(\theta_{azi}^n + \theta_{BS})}{v_{Dop}^n \sin(\theta_{azi}^m + \theta_{BS}) - v_{Dop}^m \sin(\theta_{azi}^n + \theta_{BS})} \pm \sqrt{\left(\frac{v_{Dop}^n \cos(\theta_{azi}^m + \theta_{BS}) - v_{Dop}^m \cos(\theta_{azi}^n + \theta_{BS})}{v_{Dop}^n \sin(\theta_{azi}^m + \theta_{BS}) - v_{Dop}^m \sin(\theta_{azi}^n + \theta_{BS})}\right)^2 + \frac{2(v_{Dop}^n \sin(\theta_{azi}^m + \theta_{BS}) - v_{Dop}^m \sin(\theta_{azi}^n + \theta_{BS}) - v_x^{host} \sin(\theta_{azi}^m - \theta_{azi}^n))}{v_{Dop}^n \sin(\theta_{azi}^m + \theta_{BS}) - v_{Dop}^m \sin(\theta_{azi}^n + \theta_{BS})}}$$

$$A'': \theta_{align} = \frac{v_{Dop}^n \sin(\theta_{azi}^m + \theta_{BS}) - v_{Dop}^m \sin(\theta_{azi}^n + \theta_{BS})}{v_{Dop}^n \cos(\theta_{azi}^m + \theta_{BS}) - v_{Dop}^m \cos(\theta_{azi}^n + \theta_{BS})} \pm \sqrt{\left(\frac{v_{Dop}^n \sin(\theta_{azi}^m + \theta_{BS}) - v_{Dop}^m \sin(\theta_{azi}^n + \theta_{BS})}{v_{Dop}^n \cos(\theta_{azi}^m + \theta_{BS}) - v_{Dop}^m \cos(\theta_{azi}^n + \theta_{BS})}\right)^2 + \frac{2(v_{Dop}^n \cos(\theta_{azi}^m + \theta_{BS}) - v_{Dop}^m \cos(\theta_{azi}^n + \theta_{BS}) + L_x \omega_{yaw} \sin(\theta_{azi}^m - \theta_{azi}^n))}{v_{Dop}^m \cos(\theta_{azi}^n + \theta_{BS}) - v_{Dop}^n \sin(\theta_{azi}^m + \theta_{BS})}}$$

We claim:

1. A method of determining an alignment error of an antenna, wherein:
    the antenna is installed on a vehicle and in cooperation with a radar system, the radar system is configured to determine a plurality of detections by:
        emitting a first portion of electromagnetic radiation through the antenna;
        receiving a second portion of electromagnetic radiation through the antenna; and
        evaluating the second portion of electromagnetic radiation in dependence of the first portion of electromagnetic radiation in order to localize areas of reflection of the first portion of electromagnetic radiation in a vicinity of the antenna; and
    determining the alignment error of the antenna by:
    determining a first detection and at least a second detection of the plurality of detections by using the radar system, and
    determining the alignment error by performing a joint evaluation of the first detection and the second detection by at least:
        evaluating a first algebraic expression (A', A") or a second algebraic expression (B', B"), wherein:
        the first algebraic expression (A', A") is dependent from an angular velocity component ($\omega_{yaw}$) of the vehicle;
        the first algebraic expression (A', A") is not dependent from a linear velocity component ($v_x^{host}$) representing the velocity of the vehicle in a heading direction of the vehicle;
        the second algebraic expression (B', B") is dependent from a linear velocity component ($v_x^{host}$) representing the velocity of the vehicle in the heading direction of the vehicle;
        the second algebraic expression (B', B") is not dependent from an angular velocity component ($\omega_{yaw}$) of the vehicle; and
        selecting, based on the velocity of the vehicle, one of the first algebraic expression (A', A") or the second algebraic expression (B', B") for the joint evaluation.

2. The method of claim 1, said method further comprising processing at least one of the first detection and the at least second detection from the radar system in dependence of the alignment error.

3. The method of claim 1, wherein each of the first detection and the second detection comprises an angular position relative to a reference angular position of the antenna.

4. The method of claim 1, wherein each of the first detection and the second detection comprises a velocity of the antenna relative to a velocity of an area of reflection being associated with the first detection and the second detection.

5. The method of claim 1, wherein each of the first detection and the second detection comprises an angular position relative to a reference angular position of the antenna, and each of the first detection and the second detection comprises a velocity of the antenna relative to a velocity of an area of reflection being associated with the first detection and the second detection.

6. The method of claim 1, wherein, from a plurality of detections from the radar system, the joint evaluation is only based on the first detection or the second detection.

7. The method of claim 1, wherein the joint evaluation further comprises one of:
    evaluating the first algebraic expression (A', A") under a condition that the velocity of the vehicle in a heading direction of the vehicle is above a first threshold; or
    evaluating the first algebraic expression (A', A") under a condition that the velocity of the vehicle in a direction being transverse to the heading direction is below a second threshold.

8. The method of claim 7, wherein the first algebraic expression (A', A") and the second algebraic expression (B', B") do not include a logarithm.

9. The method of claim 1, wherein the joint evaluation further comprises:
evaluating the first algebraic expression (A', A") under a condition that the velocity of the vehicle in a heading direction of the vehicle is above a first threshold; and
evaluating the first algebraic expression (A', A") under a condition that the velocity of the vehicle in a direction being transverse to the heading direction is below a second threshold.

10. The method of one of claim 1, wherein the joint evaluation further comprises one of:
evaluating the second algebraic expression (B', B") under a condition that the velocity of the vehicle in a heading direction of the vehicle is below a third threshold; or
evaluating the second algebraic expression (B', B") under a condition that the velocity of the vehicle in a direction being transverse to the heading direction is above a fourth threshold.

11. The method of one of claim 1, wherein the joint evaluation further comprises:
evaluating the second algebraic expression (B', B") under a condition that the velocity of the vehicle in a heading direction of the vehicle is below a third threshold; and
evaluating the second algebraic expression (B', B") under a condition that the velocity of the vehicle in a direction being transverse to the heading direction is above a fourth threshold.

12. The method of claim 1, wherein the method comprises:
determining a plurality of candidates for the alignment error, wherein the alignment error is determined from the candidates by processing the candidates by using at least one of a random sample consensus algorithm or a Kalman filter.

13. The method of claim 1, wherein:
the first detection is associated with a first object;
the second detection is associated with a second object; and
the first object is stationary.

14. The method of claim 1, wherein:
the first detection is associated with a first object;
the second detection is associated with a second object;
the first object and the second object are stationary; and
the vehicle is not stationary.

15. A radar system including, a control unit configured to:
determine a plurality of detections on the basis of a first portion of electromagnetic radiation emitted through an antenna installed at a vehicle, and a second portion of electromagnetic radiation received through the antenna; and
determine an alignment error of the antenna by:
determining a first detection and at least a second detection of the plurality of detections; and
determining the alignment error by performing of a joint evaluation of the first detection and the second detection including evaluating a first algebraic expression (A', A") or a second algebraic expression (B', B"), wherein:
the first algebraic expression (A', A") is dependent from an angular velocity component ($\omega_{yaw}$) of the vehicle;
the first algebraic expression (A', A") is not dependent from a linear velocity component ($v_x^{host}$) representing the velocity of the vehicle in a heading direction of the vehicle;
the second algebraic expression (B', B") is dependent from a linear velocity component ($v_x^{host}$) representing the velocity of the vehicle in the heading direction of the vehicle; and
the second algebraic expression (B', B") is not dependent from an angular velocity component ($\omega_{yaw}$) of the vehicle; and
selecting, based on the velocity of the vehicle, one of the first algebraic expression (A', A") or the second algebraic expression (B', B") for performing the joint evaluation.

16. The radar system claim 15, wherein the control unit is configured to perform the joint evaluation by at least one of:
evaluating the first algebraic expression (A', A") under a condition that the velocity of the vehicle in a heading direction of the vehicle is above a first threshold;
evaluating the first algebraic expression (A', A") under a condition that the velocity of the vehicle in a direction being transverse to the heading direction is below a second threshold;
evaluating the second algebraic expression (B', B") under a condition that the velocity of the vehicle in a heading direction of the vehicle is below a third threshold; or
evaluating the second algebraic expression (B', B") under a condition that the velocity of the vehicle in a direction being transverse to the heading direction is above a fourth threshold.

17. A non-transitory computer-readable storage medium comprising instructions, that when executed, configure at least one processor to determine an alignment error of an antenna of a radar system configured for installation in a vehicle, the alignment error determined by at least:
determining a first detection and at least a second detection of a plurality of detections; and
determining the alignment error by performing a joint evaluation of the first detection and the second detection including evaluating a first algebraic expression (A', A") or a second algebraic expression (B', B"), wherein:
the first algebraic expression (A', A") is dependent from an angular velocity component ($\omega_{yaw}$) of the vehicle;
the first algebraic expression (A', A") is not dependent from a linear velocity component ($v_x^{host}$) representing a velocity of the vehicle in a heading direction of the vehicle;
the second algebraic expression (B', B") is dependent from a linear velocity component ($v_x^{host}$) representing the velocity of the vehicle in the heading direction of the vehicle;
the second algebraic expression (B', B") is not dependent from an angular velocity component ($\Omega_{yaw}$) of the vehicle; and
performing the joint evaluation by selecting, based on the velocity of the vehicle, one of the first algebraic expression (A', A") or the second algebraic expression (B', B") for performing the joint evaluation.

18. The non-transitory computer-readable storage medium of claim 7, wherein the instructions, when executed, configure the at least one processor to perform the joint evaluation by at least one of:
evaluating the first algebraic expression (A', A") under a condition that the velocity of the vehicle in a heading direction of the vehicle is above a first threshold;

evaluating the first algebraic expression (A', A") under a condition that the velocity of the vehicle in a direction being transverse to the heading direction is below a second threshold;

evaluating the second algebraic expression (B', B") under a condition that the velocity of the vehicle in a heading direction of the vehicle is below a third threshold; or evaluating the second algebraic expression (B', B") under a condition that the velocity of the vehicle in a direction being transverse to the heading direction is above a fourth threshold.

19. The non-transitory computer-readable storage medium of claim 7, wherein the instructions, when executed, further configure a processor to:

determine a plurality of candidates for the alignment error; and determine the alignment error from the candidates by processing the candidates using of at least one of a random sample consensus algorithm or a Kalman filter.

* * * * *